(12) United States Patent
Nakad

(10) Patent No.: US 9,237,117 B2
(45) Date of Patent: Jan. 12, 2016

(54) NETWORK OF SWITCHES AND PAYLOAD OF TELECOMMUNICATIONS SATELLITE COMPRISING A NETWORK OF SWITCHES

(75) Inventor: Olivier Nakad, Toulouse (FR)

(73) Assignee: AIRBUS DEFENCE AND SPACE SAS, Les Mureaux (FR)

( * ) Notice: Subject to any disclaimer, the term of this patent is extended or adjusted under 35 U.S.C. 154(b) by 133 days.

(21) Appl. No.: 13/991,211

(22) PCT Filed: Dec. 1, 2011

(86) PCT No.: PCT/EP2011/071572
§ 371 (c)(1),
(2), (4) Date: Jul. 17, 2013

(87) PCT Pub. No.: WO2012/072773
PCT Pub. Date: Jun. 7, 2012

(65) Prior Publication Data
US 2013/0301639 A1    Nov. 14, 2013

(30) Foreign Application Priority Data
Dec. 2, 2010    (FR) ...................................... 10 04693

(51) Int. Cl.
*H04L 12/50* (2006.01)
*H04L 12/933* (2013.01)
*H04Q 3/68* (2006.01)

(52) U.S. Cl.
CPC .................. *H04L 49/15* (2013.01); *H04Q 3/68* (2013.01); *H04Q 2213/1302* (2013.01);
(Continued)

(58) Field of Classification Search
CPC ...................... H04L 49/15; H04Q 3/68; H04Q 2213/13003; H04Q 2213/1304; H04Q 2213/13046; H04Q 2213/13333; H04Q 2213/1334; H04Q 2213/13341; H04Q 2213/1302
See application file for complete search history.

(56) References Cited

U.S. PATENT DOCUMENTS 5,428,814 A * 6/1995 Mort et al. .................... 455/12.1
5,469,001 A   11/1995 Vaillant
(Continued)

FOREIGN PATENT DOCUMENTS

DE    25 38 656    3/1977
DE    43 17 856    12/1994
(Continued)

OTHER PUBLICATIONS

International Search Report dated Apr. 2, 2012, corresponding to PCT/EP2011/071572.

*Primary Examiner* — Robert Wilson
(74) *Attorney, Agent, or Firm* — Young & Thompson

(57) ABSTRACT

A network of switches includes N input accesses and M output accesses, with each of the switches including four ports and with the network input and output accesses being connection switch ports. The network includes at least one stage of switches, with each stage including: a pair of switch lines whose ports are not used as network input or output accesses, referred to as "interconnection switches", a line being a set of interconnection switches connected to one another; and at least two transverse arms linking interconnection switches of different lines, a transverse arm consisting of elements that are separate from those of the other transverse arms, a transverse arm including at least two links and a switch, referred to as "transverse switch" with the connection switches being transverse switches. At least two transverse switches from different transverse arms of each stage are connection switches of the network.

18 Claims, 4 Drawing Sheets

(52) U.S. Cl.
CPC ............... *H04Q 2213/13003* (2013.01); *H04Q 2213/1304* (2013.01); *H04Q 2213/1334* (2013.01); *H04Q 2213/13046* (2013.01); *H04Q 2213/13333* (2013.01); *H04Q 2213/13341* (2013.01)

(56) References Cited

U.S. PATENT DOCUMENTS

| | | | |
|---|---|---|---|
| 5,654,956 A | | 8/1997 | Frene et al. |
| 5,963,845 A | * | 10/1999 | Floury et al. ............. 455/12.1 |
| 6,366,579 B1 | * | 4/2002 | Lindberg .................. 370/369 |
| 6,791,978 B1 | | 9/2004 | Robichez |
| 8,033,737 B2 | * | 10/2011 | De Mul ..................... 384/564 |
| 2008/0170495 A1 | * | 7/2008 | Monse et al. ............. 370/223 |
| 2011/0110401 A1 | * | 5/2011 | Leong et al. ............. 375/211 |
| 2013/0301639 A1 | * | 11/2013 | Nakad ....................... 370/388 |

FOREIGN PATENT DOCUMENTS

| | | |
|---|---|---|
| EP | 0 599 734 | 6/1994 |
| EP | 0 690 636 | 1/1996 |
| EP | 0 749 174 | 12/1996 |
| EP | 0 750 435 | 12/1996 |
| FR | 2 752 497 | 2/1998 |
| FR | 2 774 543 | 8/1999 |
| FR | 2 808 148 | 10/2001 |

* cited by examiner

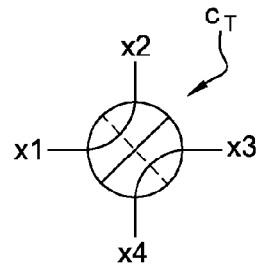
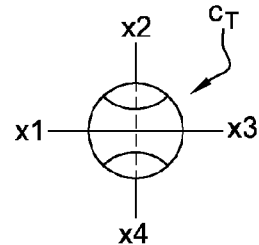
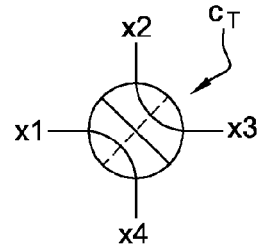
Fig. 1a      Fig. 1b      Fig. 1c
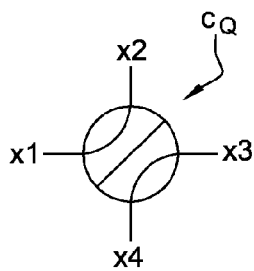
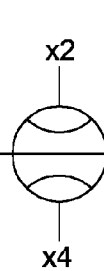
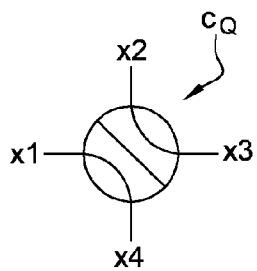
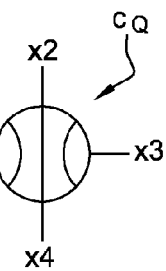
Fig. 2a      Fig. 2b      Fig. 2c      Fig. 2d
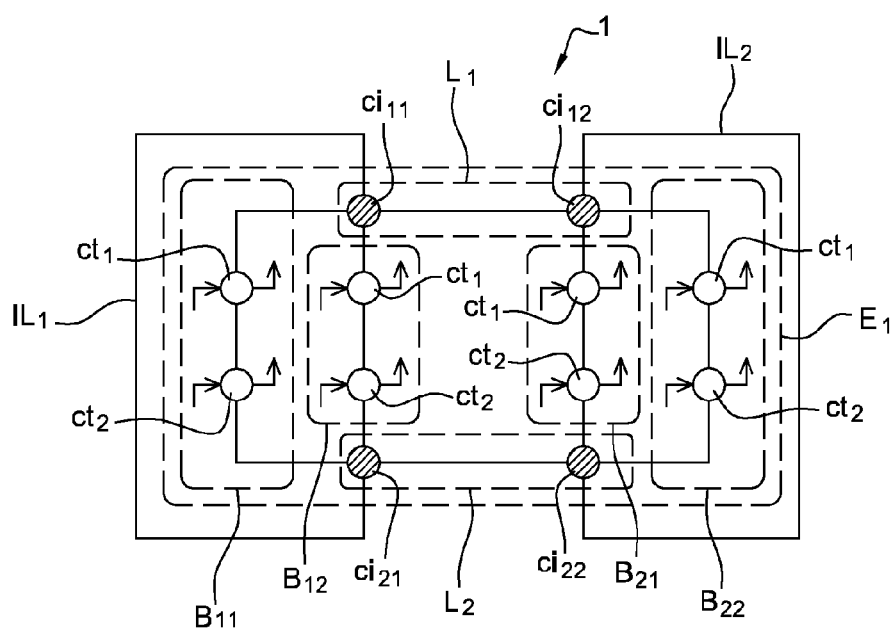
Fig. 3

NETWORK OF SWITCHES AND PAYLOAD OF TELECOMMUNICATIONS SATELLITE COMPRISING A NETWORK OF SWITCHES

BACKGROUND OF THE INVENTION

The present invention relates to networks of switches comprising N input accesses and M output accesses, adapted to connect P (P≤N and P≤M) input accesses, selected from the N input accesses, to P output accesses selected from the M output accesses.

Such networks of switches are for example used in satellite payloads, in particular of transparent telecommunications satellites, where they are generally placed upstream of or downstream from equipment such as transponders.

In general, two networks of switches are used on either side of the equipments: one network comprising N input accesses and M output accesses, upstream of the equipments and an inverted network downstream from said equipments, i.e. the same network, with the input accesses and output accesses inverted (i.e. M input ports and N output ports). Indeed, in such networks of switches, the input and output accesses are interchangeable in practice.

Such networks of switches, when they are implemented in telecommunications satellites, are adapted to establish P communication channels from among N installed channels by means of P transponders from among M available transponders.

Such networks of switches make it possible for example to deal with failures of at most (M-P) transponders (in cases where M is greater than N) by altering the paths of the P input signals in the network such as to route them exclusively towards equipment in working order.

Currently, the switches used in telecommunications satellites' on-board networks comprise four ports, and are most often three-state or four-state switches (these states are generally known as "positions").

FIGS. 1a, 1b and 1c represent respectively the three states of a three-state switch $c_T$:
  one state wherein a first port x1 is connected to a second port x2 and a third port x3 is connected to a fourth port x4;
  one state wherein the first port x1 is connected to the third port x3 and the second port x2 is connected to the fourth port x4;
  one state wherein the first port x1 is connected to the fourth port x4 and the second port x2 is connected to the third port x3.

FIGS. 2a, 2b 2c and 2d represent respectively the four states of a four-state switch $c_Q$:
  one state wherein a first port x1 is connected to a second port x2 and a third port x3 is connected to a fourth port x4;
  one state wherein the first port x1 is connected to the third port x3;
  one state wherein the first port x1 is connected to the fourth port x4 and the second port x2 is connected to the third port x3;
  one state wherein the second port x2 is connected to the fourth port x4.

It is understood therefore that, by altering the state of each switch, it is possible to modify the ports effectively connected with each other for each switch and, consequently, to modify the choice of the P input accesses and P output accesses that are mutually and individually connected.

Within the field of telecommunications satellites, the design of a network of switches requires a complex study aimed at determining both a logical configuration (i.e. the number of switches and which ones of these are connected to each other) and a physical installation (i.e. the final arrangement of the switches and of the linking elements between the switches), which meet the operating constraints, in particular of small size.

The design of networks of switches is increasingly complex, particularly because of the increase in:
  the number of transponders installed in a single satellite, some of said transponders being redundant transponders provided to deal with possible failures,
  the flexibility required for these networks, i.e. their ability to simultaneously establish many different combinations of paths between their input accesses and their output accesses.

It is also understood that the flexibility and size constraints are conflicting constraints and the result of the design study is usually a compromise between these two constraints.

A matrix network of switches is known from patent application EP 0876069, derived from networks of switches used in terrestrial telecommunications. This network of switches can be built modularly.

However, a drawback of the network of switches described in patent application EP 0876069 is that the number of switches increases rapidly as the number of input accesses and output accesses is increased. In addition to this network's size, the average number of switches passed through to establish the P paths in the network will also increase. In practice, it is important to reduce the average number of switches passed through, as a signal is attenuated by each passage of this signal through a switch.

SUMMARY OF THE INVENTION

The present invention aims at proposing a network of switches that allows a high level of flexibility while also limiting the number of switches required and the average number of switches passed through, in particular in the case of asymmetric networks, i.e. whose number of input accesses N is different from the number of output accesses M.

Another aim of the present invention is to propose a network of switches with a logical configuration that allows a simple installation, whose design can largely benefit from prior realizations, and which can be built modularly.

The present invention relates primarily to a network of switches comprising N input ports and M output ports, with each of the switches comprising four ports and with the network input and output accesses being switch ports, referred to as "connection switches". The network of switches according to the invention comprises at least one stage of switches, each stage comprising:
  a pair of switch lines whose ports are not used as network input or output accesses, referred to as "interconnection switches", a line being a set of interconnection switches connected to one another,
  transverse arms linking interconnection switches of different lines of the same stage, a transverse arm consisting of elements that are separate from those of the other transverse arms of the stage, a transverse arm comprising at least two links and a switch, referred to as "transverse switch".

In addition, each stage of the network comprises at least two transverse switches, from different transverse arms, which are used as connection switches of the network. In addition, at least one interconnection switch of one line of a stage is connected to at least one interconnection switch of the other line of the same stage or of a line of another stage of the network, by a link comprising no switch, referred to as "inter-line link".

Such a configuration of the network of switches, comprising at least one such stage of switches, makes it possible to achieve good properties both in terms of flexibility and of the number of switches passed through. In particular, the at least one inter-line link allows a direct path to be established between two lines of the network without passing through any switches.

The flexibility afforded by the network of switches increases in with the number of inter-line links.

Accordingly, in a particular embodiment, each interconnection switch of at least one line of a stage is connected, by an inter-line link, to an interconnection switch of the other line of the same stage or of another line of another stage of the network.

When the network comprises at least two stages, all the interconnection switches of a line of a stage are advantageously connected to respective interconnection switches of a same other line of another stage of the network.

As a variant or an alternative, when the network comprises at least two stages, one or several lines of interconnection switches, separate from said stages and said "intermediate lines", can be provided between two stages of the network. In such a case, all the interconnection switches of a line of a stage are advantageously connected to respective interconnection switches of a same line of another stage of the network through respective interconnection switches of said intermediate line.

Such provisions, according to which at least two interconnection switch lines are then provided between transverse arms belonging to two different stages of the network (one line from each network and possibly one or several intermediate lines), make it possible to improve performance in terms of flexibility and robustness against equipment failures. The inventors have noted, in addition, that the presence of at least two such interconnection switch lines makes it possible to obtain a good level of performance including for networks wherein the number of input accesses N is very different from the number of output accesses M (e.g. 14 input accesses and 28 output accesses).

Preferably, in order to optimize the flexibility provided by the network, each interconnection switch of each line of each stage of the network is connected to an interconnection switch of another line of interconnection switches of the network by an inter-line link. Said other line of network switches can either be the other line of the same stage of the network or another line of another stage of the network or, if applicable, an intermediate line of the network.

According to other particular embodiments, the network of switches comprises one or several of the following characteristics, considered alone or according to any technically possible combination:

all the interconnection switches of a line of a stage are connected by respective transverse arms to respective interconnection switches of the other line of the same stage;
  each interconnection switch of a line of a stage is connected by one or several transverse arms to only one interconnection switch of the other line of the same stage;
  all the connection switches of the network are transverse switches of said network;
  at least one transverse switch of each transverse arm of the network is a connection switch of said network;
  each transverse arm of at least one stage comprises exactly two transverse switches;
  at least one transverse switch is connected to a transverse switch of another transverse arm of the network by a link comprising no switches, referred to as "inter-arm link";
  at least one port of at least one transverse switch neither connected to another switch of the network, nor used as an input access or output access of said network;
  the interconnection switches placed at the ends of at least one line of a stage are connected to one another by a link comprising no switches, referred to as "intra-line link";
  the lines of interconnection switches of the network are installed substantially straight and substantially parallel to each other, along a longitudinal direction of the network;
  the transverse arms are installed, between the network lines, substantially straight and substantially parallel along a transverse direction, not parallel to the longitudinal direction making an angle, preferably a right angle, with said longitudinal direction.

The present invention relates also to a telecommunications satellite payload comprising at least one network of switches according to any one of the embodiments of the invention. In addition, the present invention is also related to a telecommunications satellite with such a payload on board.

BRIEF DESCRIPTION OF THE DRAWINGS

The invention will be better understood in reading the following description of a non-limiting example, made with reference to the figures, which represent:

FIGS. 1 and 2: already mentioned, representations of three- and four-state switches that may be used in the invention;

FIGS. 3 to 7: schematic representations of exemplary embodiments of a network of switches according to the invention.

DETAILED DESCRIPTION OF THE PREFERRED EMBODIMENTS

Figure 4:
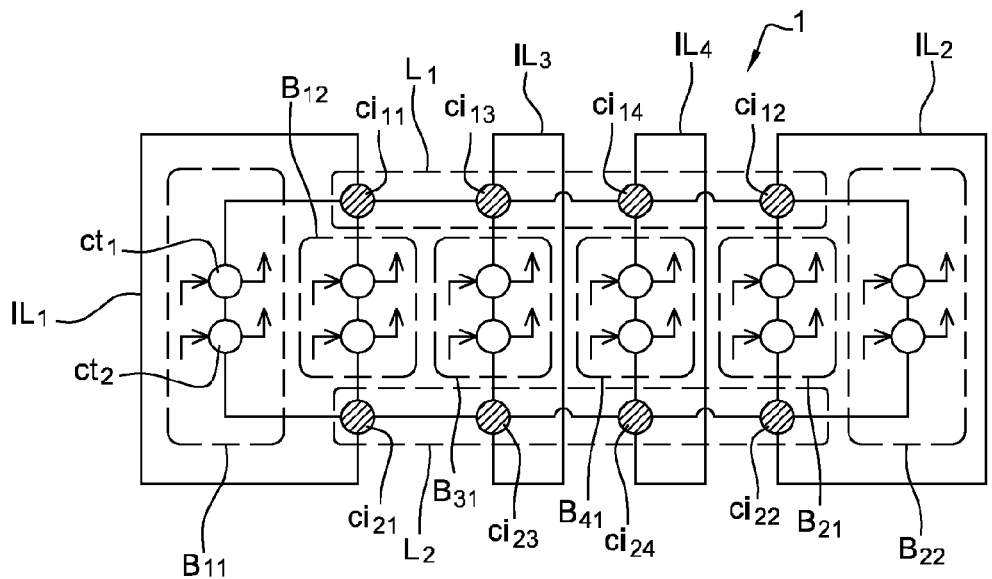

The present invention relates to a network of switches comprising N input accesses and M output accesses, adapted to connect P ($P \leq N$ and $P \leq M$) input accesses selected from the N input accesses to P output accesses selected from the M output accesses.

The present invention finds a particularly advantageous, though in no way limiting, application in satellite telecommunications systems.

The present invention relates to networks of four-port switches, in particular three- or four-state switches such as those described with reference to FIGS. 1 and 2, or any other type of four-port switch adapted for satellite applications. Nothing precludes, according to other examples, from having two-state switches.

Such a network makes it possible to route P signals, injected into the network from P input accesses towards P output accesses.

The invention is applicable to many types of signals, in particular electrical signals or electromagnetic waves. The invention is not limited to a specific frequency band, but can be used with different frequency bands, in particular the frequency bands traditionally used in satellite telecommunications systems (bands Ku, Ka, C, etc.)

Such a network consists mainly of switches whose ports are connected by linking elements. Depending on the type of the routed signals, the linking elements are, for example, wave-guides, coaxial cables, etc.

In the remainder of the description, a network "path" refers to the track established by choosing the state of each switch in the network (i.e. for each switch, the ports that are connected to each other), which track will be followed by a signal between an input access and an output access.

Also, "connection switch" refers to a switch, wherein at least one port is used as the network's input or output access, i.e. with at least one port not connected to another switch and whereby a signal is to be injected into the network or is to be collected at the exit from said network.

"Interconnection switch" refers to a switch wherein no port is used as the network's input or output access, i.e. with every port being either connected to another switch or not used.

Also, "line" refers to a series of interconnection switches connected to one another by linking elements. In other words, a line comprises an interconnection switch connected to another interconnection switch, which is itself possibly (if the number of interconnection switches for this line is greater than two) connected to another interconnection switch, etc.

"Link" refers to a linking element or to several linking elements placed end-to-end, without intermediate switches.

Two switches are deemed to be "connected" when a path is possible between these two switches. This possible path may be direct (via a link, said switches can in that case also be referred to as "connected") or indirect, via other switches. It should be noted that this corresponds to a possible path, i.e. which is defined regardless for the status of each switch on this path; it is sufficient that one state of each switch to allows for routing a signal from one end of this possible path to the other end.

A network 1 according to the invention comprises one or several stages of switches. Each stage of the network comprises a pair of interconnection switch lines. In addition, each said stage comprises transverse arms linking the interconnection switches of different lines of this stage.

A transverse arm consists of elements that are separate from the elements of the other transverse arms, i.e. belonging to no other transverse arm. A transverse arm consists in addition of elements that are separate from the lines of the stage's pair of lines. The elements making up a transverse arm are at least two links and a switch, referred to as "transverse switch". More generally, a transverse arm consists of K (K≥1) transverse switches and of (K+1) links to connect the transverse switches to one another and to connect them to the interconnection switches making up the ends of this transverse arm.

At least two transverse switches from different transverse arms of each stage are connection switches of network 1, i.e. they comprise ports used as input accesses and/or output accesses of said network. Preferably, all the network's connection switches are transverse switches, i.e. all the connection switches are preferably placed on transversal arms of the network 1.

It should be noted that nothing precludes including a network according to the invention in a more complex network of switches. In such a case, the network according to the invention would constitute a sub-network of the more complex network and it is understood that said more complex network's connection switches might not all be placed on transverse arms of the sub-network according to the invention.

In the remainder of the description, the case wherein all the switches of network 1 are organized in stages such as described previously, is considered, i.e. each stage comprises a pair of interconnection switch lines and transverse arms connecting interconnection switches from different lines of the same stage. In addition, the case where all the connection switches of the network are transverse switches is considered.

Preferably, an interconnection switch of a line of a stage is connected by one or several transverse arms to only one interconnection switch of the other line of that stage.

It will be seen later that such a logical network configuration has many advantages. In particular, it will be seen that such a logical configuration makes it possible, starting from a given network, to easily design a larger network and also allows installation to be simple and realized modularly.

FIGS. 3 to 7 show schematically examples of realization of networks 1 of switches according to the invention. On these figures, the switches are represented schematically by circles, with the interconnection switches being cross-hatched in addition. The links (wave-guides, coaxial cables, etc.) between switches are represented by continuous lines. In these figures, identical references refer to identical or analogous elements.

Example of Realization of a Single-Stage Network

FIG. 3 represents a first example of realization of a network 1 comprising one stage $E_1$ of switches.

As shown in FIG. 3, stage $E_1$ comprises a pair of interconnection switch lines, $L_1$ and $L_2$, respectively. In this non-limiting example, each line $L_1$, $L_2$ comprises two interconnection switches designated $ci_{11}$ and $ci_{12}$ for line $L_1$ and $ci_{21}$ and $ci_{22}$ for line $L_2$.

From the point of view of the number of lines (two) and the number of interconnection switches (two per line), the network 1 illustrated in FIG. 3 corresponds to a minimum configuration of a network according to the invention.

The network 1 of FIG. 3 comprises four transverse arms, connecting the interconnection switches of the two lines $L_1$ and $L_2$:

two transverse arms $B_{11}$ and $B_{12}$ between the interconnection switch $ci_{11}$ and the interconnection switch $ci_{21}$;

two transverse arms $B_{21}$ and $B_{22}$ between the interconnection switch $ci_{12}$ and the interconnection switch $ci_{22}$.

The transverse arms $B_{11}$, $B_{12}$, $B_{21}$ and $B_{22}$ each comprise two transverse switches, designated $ct_1$ and $ct_2$ in each of these links.

The network also comprises two links connecting the interconnection switches of different lines, referred to as "inter-line links" $IL_1$, $IL_2$. The inter-line link $IL_1$ connects the interconnection switches $ci_{11}$ and $ci_{21}$ and the inter-line link $IL_2$ connects the interconnection switches $ci_{12}$ and $ci_{22}$ of network 1.

In the example shown in FIG. 3, all the transverse switches are connection switches. Indeed, each transverse switch $ct_1$, $ct_2$ comprises two available ports, i.e. two ports not used to form the transverse arm of this transverse switch (i.e. not connected to an interconnection switch or to a transverse switch of this same transverse arm). The two available ports of each transverse switch are used respectively as the input access (represented by an arrow pointing in the direction of said transverse switch) and as the output access (represented by an arrow pointing away from said transverse switch) of network 1. The number of input accesses N and the number of output accesses M of network 1 of FIG. 3 are both equal to the number of transverse switches of said network, i.e. eight.

Such a network comprising the same number of input accesses and output accesses is referred to as a "symmetrical network". It is understood, however, that such a symmetrical network has only a limited interest insofar as its flexibility is limited, in particular because the number of interconnection switches is much lower than the numbers N of input accesses and M of output accesses.

However, such a network can serve as a basis for designing other more complex networks, in particular asymmetric networks with N being different than M. For example, it is possible to connect some of the transverse switches to each other by links referred to as "inter-arm links" IB, comprising no switch. It is also possible not to use some of the available ports, i.e. not to consider it as a network input or output access and not to connect it to another switch of network 1. Consequently, it is understood that the number of input accesses and/or output accesses will thus be modified and that some transverse switches of the network will no longer be connection switches.

FIG. 4 represents a second example of realization of a network 1 comprising a single stage $E_1$.

Compared with the network shown in FIG. 3, the network of FIG. 4 has been extended longitudinally, i.e. by adding interconnection switches on each of the lines $L_1$ and $L_2$ and transverse arms between these two lines.

It can be seen that this longitudinal extension can be obtained by inserting one or several elementary patterns between interconnection switches of each line. Each elementary pattern consists of, for example, an assembly formed by the transverse switches of a transverse arm, with the two interconnection switches forming the extremities of this transverse arm, and the links that connect said transverse switches to one another and to the interconnection switches.

In the example illustrated in FIG. 4, two such elementary patterns were inserted, between the interconnection switches $ci_{11}$ and $ci_{12}$ firstly, $ci_{21}$ and $ci_{22}$ secondly:
- a first elementary pattern consisting of two interconnection switches $ci_{13}$ (on line $L_1$) and $ci_{23}$ (on line $L_2$) and two transverse switches $ct_1$ and $ct_2$ of a transverse arm $B_{31}$;
- a second elementary pattern consisting of two interconnection switches $ci_{14}$ (on line $L_1$) and $ci_{24}$ (on line $L_2$) and two transverse switches $ct_1$ and $ct_2$ of a transverse arm $B_{41}$.

In addition, the interconnection switches $ci_{13}$ and $ci_{23}$ are linked by an inter-line link $IL_3$ and the interconnection switches $ci_{14}$ and $ci_{24}$ are linked by an inter-line link $IL_4$.

It is understood that, from a logical configuration point of view, designing a larger stage is simple and consists essentially in adding elementary patterns and links. From an installation point of view, these patterns can also be implemented as prefabricated modules, which will be easier to install.

As in the case of the network of FIG. 3, the network 1 of FIG. 4 is symmetrical and each of its transverse switches is a connection switch that comprises both an input access and an output access. As previously indicated, such a symmetrical network is preferably used as a basis network to design more complex networks, for example by linking some transverse switches to one another by inter-arm links IB and/or by not using some of the available ports.

It should be noted that, in each of the examples shown in FIGS. 3 and 4, an interconnection switch of a line of stage $E_1$ is connected by transverse arms and inter-line links to only one interconnection switch of the other line of that stage. Such a logical configuration corresponds to a preferred embodiment.

These are non-limiting examples of the invention. In particular, it is understood that, in the example shown in FIG. 3, the inter-line links $IL_1$ and $IL_2$, which comprise no switch, could link the interconnection switches $ci_{11}$, $ci_{22}$ for the inter-line link $IL_1$ and $ci_{12}$, $ci_{21}$ for the inter-line link $IL_2$.

However, it should be noted that it is advantageous to connect, by transverse arms and inter-line links, each interconnection switch of a line of a stage to only one interconnection switch of the other line of that stage. Indeed, this simplifies the installation of the network insofar as it makes it possible to avoid link crossings as much as possible, which crossings require having overlapping linking elements (wave-guides, coaxial cables, etc.) whose geometry is consequently more complex.

In the examples shown in FIGS. 3 and 4, all the ports of each interconnection switch are connected to an interconnection switch of the other line or to a transverse switch.

Other examples are also possible. For example, in the example shown in FIG. 4, nothing precludes from not realizing the transverse arms $B_{11}$ and $B_{22}$. The available ports of the interconnection switches placed at the ends of the lines $L_1$ and $L_2$ may be unused or may be used to connect the interconnection switches at the ends of a single line to one another by means of a link referred to as "intra-line link". Preferably, at least one interconnection switch of one line of the stage $E_1$ is connected to at least one interconnection switch of the other line of that stage by at least one transverse arm and one inter-line link.

More generally, the number of transverse switches may not be the same from one transverse arm to another. For example, nothing precludes from having one or several transverse arms, each with a transverse switch, one or several transverse arms, each with two transverse switches, etc. In such a case, extending a stage can be achieved by choosing an elementary pattern from a finite set of elementary patterns, corresponding to the various transverse arm configurations.

The case wherein each transverse arm comprises exactly two transverse switches constitutes, nevertheless, a preferred embodiment, because in this case, each transverse switch is connected to an interconnection switch. In addition, since the number of transverse switches of each transverse arm is predefined, the network will consist mainly of identical prefabricated modules, to which additional links and possibly transverse switches are added to be linked to the interconnection switches forming the ends of lines $L_1$, $L_2$ (the transverse switches of the transverse arms $B_{11}$ and $B_{22}$ in FIGS. 3 and 4).

Examples of Realization of a Two-Stage Network

In the remainder of the description of examples of realization of a two-stage network, the case considered in a non-limiting way is that wherein each transverse arm comprises exactly two transverse switches and wherein all the ports of the interconnection switches are used by transverse arms or inter-line links.

Figure 5:
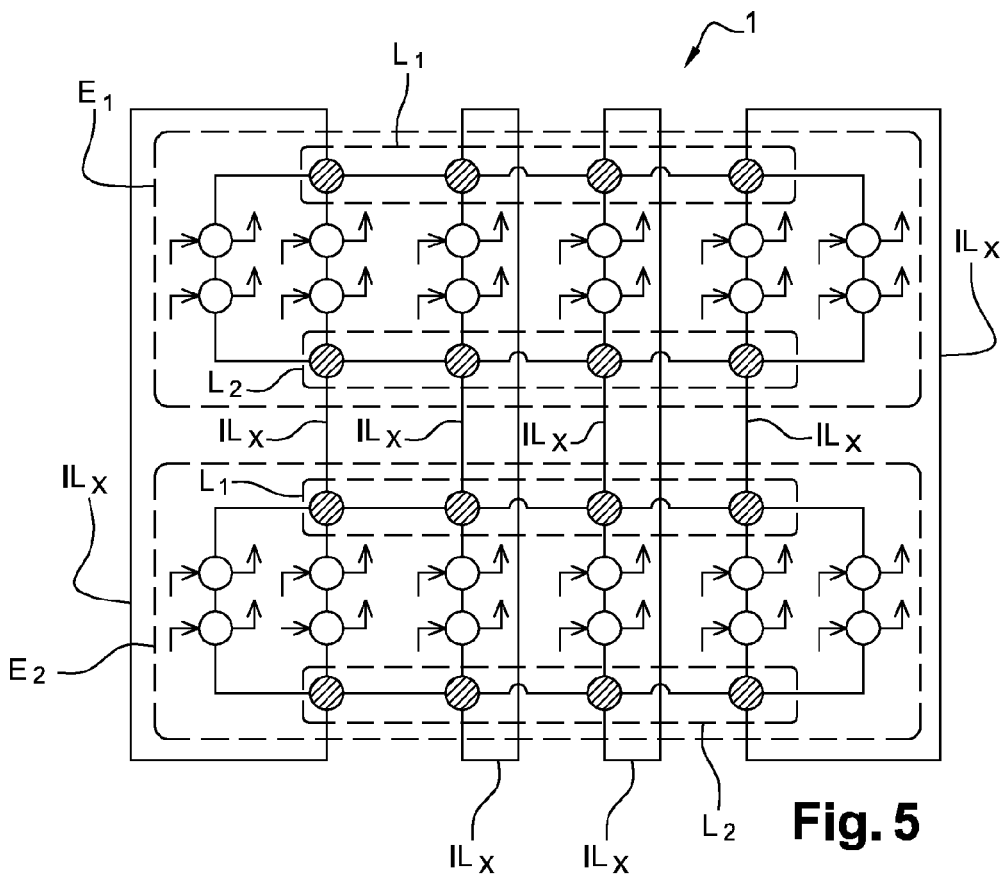

FIG. 5 represents a first example of realization of a network with two stages $E_1$ and $E_2$.

In its principle, each stage of network 1 of FIG. 5 corresponds to the stage of network 1 with the inter-line links $IL_1$, $IL_2$, $IL_3$, $IL_4$ removed and replaced by inter-line links $IL_X$, which connect interconnection switches of different stages $E_1$, $E_2$ to one another.

In the example shown in FIG. 5, stage $E_1$ comprises two lines $L_1$ and $L_2$ and stage $E_2$ comprises two lines, also designated $L_1$ and $L_2$. Each interconnection switch of line $L_1$ of stage $E_1$ is connected by an inter-line link $IL_X$ to one interconnection switch of line $L_2$ of stage $E_2$. Each interconnection switch of line $L_2$ of stage $E_1$ is also connected by an inter-line link $IL_X$ to one interconnection switch of line $L_1$ of stage $E_2$.

Such inter-line links $IL_X$, in particular those that connect the interconnection switches of non-adjacent lines of network 1 when the network is installed (line $L_1$ of stage $E_1$ and line $L_2$ of stage $E_2$), allow routing a signal from one end of the network to the other while limiting the number of switches passed through and the associated insertion losses.

More generally, it should be noted that nothing precludes, in the case of a network comprising at least two stages $E_1$, $E_2$, from considering a lower number of inter-line links $IL_X$ connecting the interconnection switches of different stages. However, when the network comprises at least two stages, at least one interconnection switch of one stage must be connected to an interconnection switch of another stage by an inter-line link $IL_X$, so as to allow paths to be established between these stages. It is understood that, when increasing the number of inter-line links $IL_X$, the number of paths that can be established simultaneously between the stages is also increased, thus improving the flexibility provided by the network 1.

Figure 6:
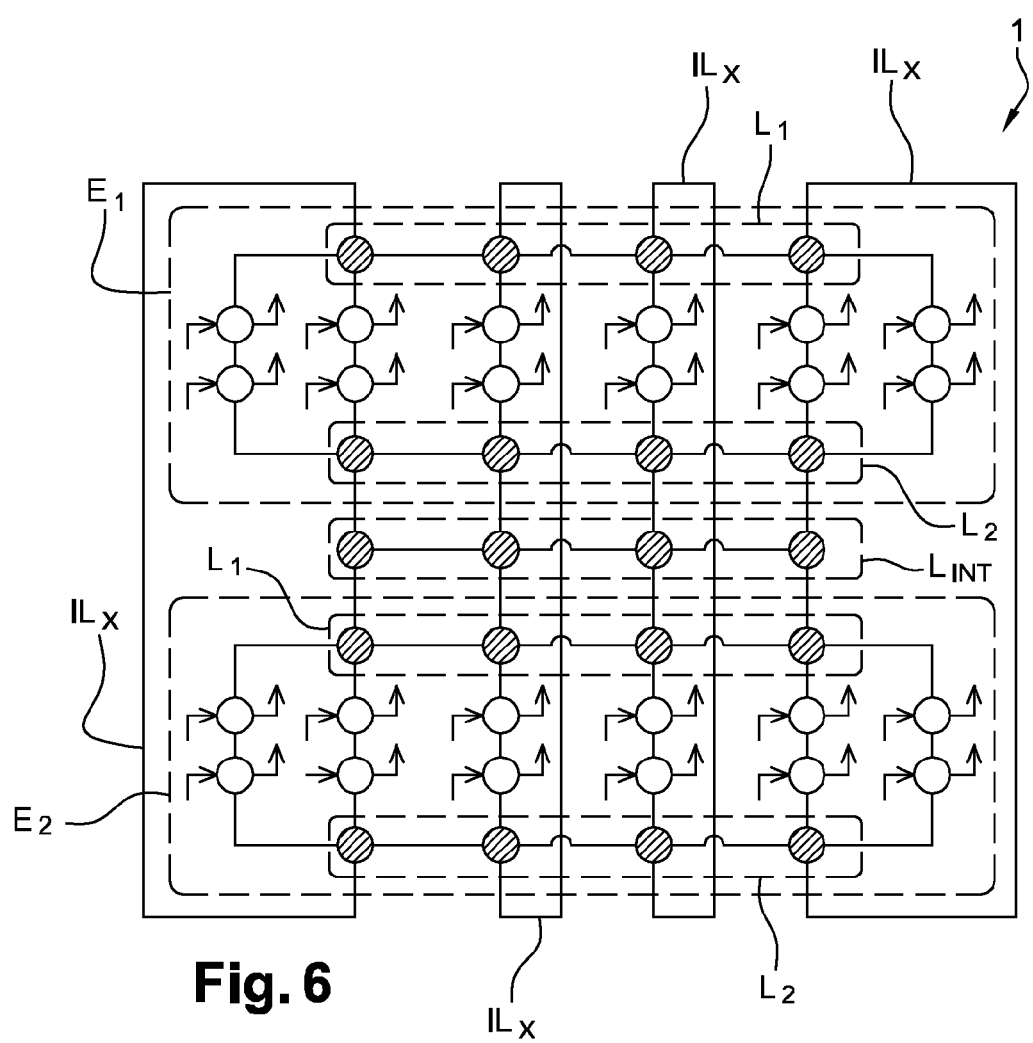

FIG. 6 represents another example of realization of a network 1 comprising two stages $E_1$ and $E_2$. In this example, the network 1 comprises, between said two stages, a line of interconnection switches referred to as "intermediate line" $L_{INT}$, separate from said two stages and by means of which the interconnection switches of line $L_2$ of stage $E_1$ and of line $L_1$ of stage $E_2$ are linked.

Because of the intermediate line $L_{INT}$ between the stages $E_1$ and $E_2$, the number of paths that can be established simultaneously between the stages is increased. Nothing precludes from considering several intermediate lines between the stages $E_1$ and $E_2$, connected to one another to further increase the number of paths that can be established simultaneously between the stages.

In the example shown in FIG. 6, and in a non-limiting manner, two interconnection switches of the intermediate line $L_{INT}$, both designated $ci_{INT}$, comprise one unused port. These two ports, in other examples not shown in the figures, are connected by an intra-line link.

More generally, the invention is not limited to two stages and it is understood that, according to other examples, the network 1 comprises three or more stages, linked to one another in accordance with any one of the solutions described with reference to FIGS. 5 and 6. Within a single network, nothing precludes from having pairs of stages linked to each other in a different way, e.g. two stages linked by means of at least one intermediate line $L_{INT}$ and two stages linked directly, as described with reference to FIG. 5.

The network illustrated by FIGS. 5 and 6 are symmetrical networks, wherein each transverse switch comprises one input access and one output access. Consequently, N and M are both equal to the number of transverse switches.

As previously indicated with reference to FIGS. 3 and 4, such symmetrical networks serve advantageously as basis networks for designing more complex networks, for example by adding inter-arm links and/or by leaving available ports unused. Where applicable, the inter-arm links connect transverse switches of a single stage and/or of different stages.

Figure 7:
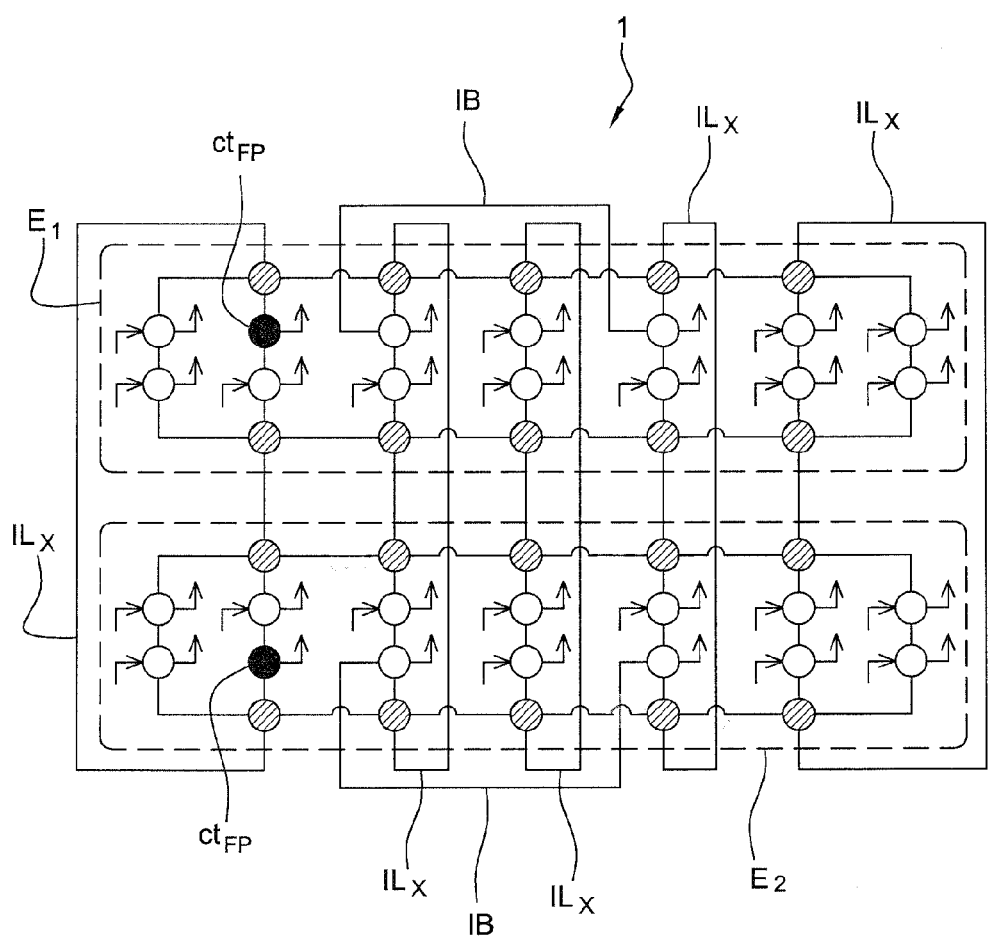

FIG. 7 represents an example of realization of a network 1 comprising a number of input accesses N equal to 22 and a number of output accesses equal to 28; this allows, for example, having a total of 28 transponders, 6 of which are redundant transponders.

The network 1 of FIG. 7 comprises two stages $E_1$ and $E_2$. Each line of the network 1 comprises five interconnection switches and each stage $E_1$, $E_2$ comprises seven transverse arms each comprising two transverse switches $ct_1$ and $ct_2$ and each interconnection switch is connected to an interconnection switch of another stage by an inter-line link $IL_X$.

The network 1 of FIG. 7 therefore comprises a total of 28 transverse switches. In order to obtain 22 input accesses and 28 output accesses, some transverse switches have been connected to one another and some ports of the transverse switches are unused. Starting from a symmetrical network wherein each transverse switch comprised two available ports for an input access and an output access, two of the input accesses were connected individually to two other input accesses of other transverse switches by inter-arm links IB. In the example shown, these are inter-arm links IB between transverse switches of a single stage $E_1$, $E_2$. In addition, two input accesses of two other transverse switches, designated $ct_{FP}$ and showed filled in black in FIG. 7, are unused.

It should be noted that the positions, within the matrix of transverse switches of network 1, of the transverse switches $ct_{FP}$ and of the transverse switches linked by inter-arm links IB, are not necessarily all equivalent in terms of the flexibility of the network achieved. These positions are, for example, chosen by evaluating, by simulation or any other means available to the man skilled in the art, the levels of performance offered by different logical configurations corresponding to different positions of these transverse switches. The levels of performance of a given configuration are, for example, evaluated in terms of flexibility and/or of the average number of switches passed through.

It has been noted that, during the implementation of networks of switches according to the invention, excellent levels of performance can be achieved, in terms of flexibility and of the number of switches passed through, with a smaller total number of switches, lower than the number of switches in the networks described in the prior art, including asymmetrical networks. Accordingly, such networks make it possible to ensure both redundancy and flexibility.

In addition, this invention also has many advantages for the installation of the network of switches.

Indeed, the lines $L_1$, $L_2$ of interconnection switches of the network 1 are preferably installed substantially straight and substantially parallel along a direction referred to as the "longitudinal direction" of said network.

Preferably, the transverse arms are installed, between the lines $L_1$, $L_2$, substantially straight and substantially parallel along a direction referred to as "transverse direction", not parallel to the longitudinal direction, making an angle, preferably a right angle, with said longitudinal direction.

However, when two interconnection switches are linked by two transverse arms, only one of these transverse arms is installed along the transverse direction. The other transverse arm (the transversal arm $B_{11}$ or $B_{22}$ in FIGS. 3 and 4) is not installed between the lines and is not installed substantially straight; however, the transverse switches of this transverse arm are preferably aligned along an axis that is substantially parallel to the transverse direction.

Such an installation is obtained, for example, by means of prefabricated modules corresponding to the elementary patterns mentioned above or to more complex elementary patterns. Preferably, the prefabricated modules can also include the linking elements between the switches of the elementary pattern. By incorporating the linking elements into the prefabricated modules, the resulting network will be, in general, more compact than if it had been manufactured by installing the switches beforehand and then installing the linking elements connecting them.

In addition, with such an installation, the linking elements between prefabricated modules can be mostly short and substantially straight. Most of these linking elements will have substantially the same geometry.

Because of this, most of the linking elements have a geometry that can be used in several places in the network since most of the links in the network can be manufactured with a small number of different geometries of the linking elements. In practice, only the inter-arm links have a specific geometry, which cannot be used in several places of the network and are consequently made to measure. However, there are in general a small number of these inter-arm links.

In addition, designing a new network will benefit significantly from prior realizations insofar as, from a logical point of view, extending an existing network is achieved by simply adding elementary patterns within a stage and/or by adding one or several stages. The choice of extending the network longitudinally (by adding elementary modules) and or transversely (by adding stages) can take into account the dimensions of the facility where the network is to be installed.

The invention claimed is:

1. A network, comprising:
   connection switches arranged to provide N input accesses and M output accesses to the network, N and M being integers, N being a number of input accesses and M being a total number of output accesses,
   where P output accesses are selected from the M total output accesses, P being an integer, P≤N, and P≤M,
   each connection switch of the network having four ports and at least two different selectable states that correspond to an establishment of different internal connections between the four ports, and at least one of said four ports connected to provide one of said N input accesses or one of said M output accesses, said connection switches arranged as one or more stages of switches, each stage of switches including:
   a pair of lines of interconnection switches, each line being a set of said interconnection switches connected to one another, and each of said interconnection switches having four ports, none of which are connected as input or output accesses to the network, and
   transverse arms linking the interconnection switches of different lines of a same stage, each transverse arm consisting of elements that are separate from those of the other transverse arms of the same stage, and each transverse arm comprising a transverse switch that has at least two links and one switch,
   wherein at least two of said transverse switches from different ones of said transverse arms of each of said one or more stages are connection switches of the network, and
   wherein at least one interconnection switch of a first line of any stage of said one or more stages is connected by an inter-line link to an interconnection switch of a second line of the same stage or of a line of another stage of the network, each inter-line link being a link having no switch.

2. The network according to claim 1, wherein each interconnection switch of the first line of a stage is connected by an inter-line link to an interconnection switch of the second line or of another line of another stage of the network.

3. The network according to claim 1, wherein, said network comprising at least two of said one or more stages, all the interconnection switches of a line of any one stage being connected to respective interconnection switches of another line of another stage of the network.

4. The network according to claim 1,
   wherein said network comprises at least two of said one or more stages,
   wherein said network further comprises at least one intermediate line of interconnection switches, and
   wherein all the interconnection switches of a line of any stage of said at least two stages are connected to respective interconnection switches of another line of another stage of the at least two stages by means of respective interconnection switches of said at least one intermediate line.

5. The network according to claim 1, wherein each interconnection switch of each line of each stage is connected to an interconnection switch of another line of the network by an inter-line link.

6. The network according to claim 1, wherein all the interconnection switches of a line of a stage are linked by respective transverse arms to respective interconnection switches of the other line of the same stage.

7. The network according to claim 1, wherein each interconnection switch of the first line is linked by one or several transverse arms to only one interconnection switch of the second line.

8. The network according to claim 1, wherein all the connection switches of the network are transverse switches of said network.

9. The network according to claim 1, wherein each transverse arm of at least one of said one or more stages comprises exactly two transverse switches.

10. The network according to claim 1, wherein at least one transverse switch is connected to a transverse switch of another transverse arm of the network by an inter-arm link having no switches.

11. The network according to claim 1, wherein at least one port of at least one transverse switch is neither connected to another switch of the network, nor used as an input access or output access of said network.

12. The network according to claim 1, wherein the interconnection switches placed at the ends of at least one line of a stage are connected to one another by an inter-arm link having no switches.

13. The network according to claim 1, wherein the lines of interconnection switches of the network are installed straight and parallel to each other along a longitudinal direction of the network.

14. The network according to claim 13, wherein the transverse arms are installed, between the lines of the network, straight and parallel along a transverse direction, not parallel to the longitudinal direction, forming an angle with said longitudinal direction.

15. The network according to claim 14, wherein the angle formed by the transverse direction with said longitudinal direction is a right angle.

16. The network according to claim 1,
   wherein said network comprises at least two of said one or more stages, and
   wherein each interconnection switch of said network is linked to another interconnection switch of a same stage by at least one transverse arm, and is connected to another interconnection switch of an intermediate line of the network or of a line of another stage of the network by an inter-line link.

17. The network according to claim 16, wherein all the connection switches of the network are transverse switches of said network.

18. A telecommunications satellite payload, comprising:
   one or more networks of switches each of said one or more networks comprising:
   connection switches arranged to provide N input accesses and M output accesses to the network,
   N and M being integers, N being a number of input accesses and M being a total number of output accesses,
   where P output accesses are selected from the M total output accesses, P being an integer, P≤N, and P≤M,
   each connection switch of the network having four ports and at least two different selectable states that correspond to an establishment of different internal connections between the four ports, and at least one of said four ports connected to provide one of said N input accesses or one of said M output accesses, said connection switches arranged as one or more stages of switches, each stage of switches including:

a pair of lines of interconnection switches, each line being a set of said interconnection switches connected to one another, and each of said interconnection switches having four ports, none of which are connected as input or output accesses to the network, and transverse arms linking the interconnection switches of different lines of a same stage, each transverse arm consisting of elements that are separate from those of the other transverse arms of the same stage, and each transverse arm comprising a transverse switch that has at least two links and one switch, wherein at least two of said transverse switches from different ones of said transverse arms of each of said one or more stages are connection switches of the network, wherein at least one interconnection switch of a first line of any stage of said one or more stages is connected by an inter-line link to an interconnection switch of a second line of the same stage or of a line of another stage of the network, each inter-line link being a link having no switch, and wherein transponders are connected to the input accesses of said network of switches, and transponders are connected to the output accesses of said network of switches.

* * * * *